Jan. 11, 1927.
B. H. SMITH
1,614,212
METERING SYSTEM
Filed May 7, 1924    2 Sheets-Sheet 1
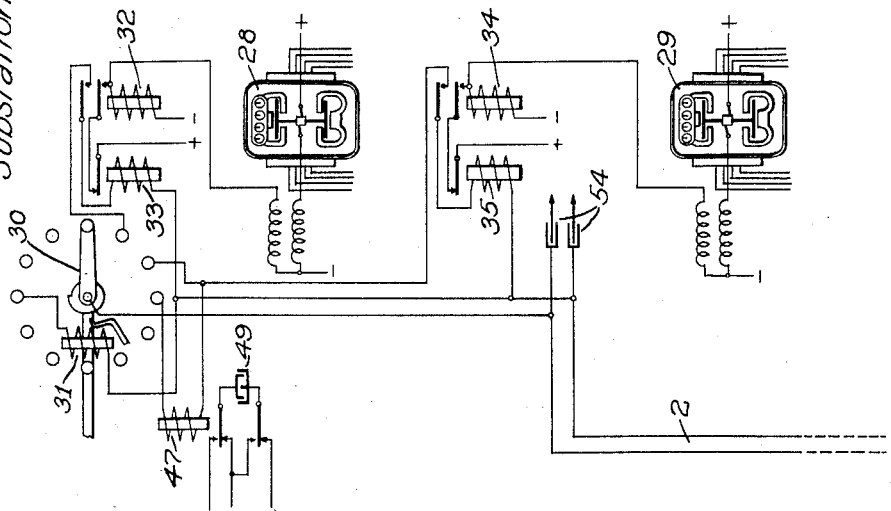
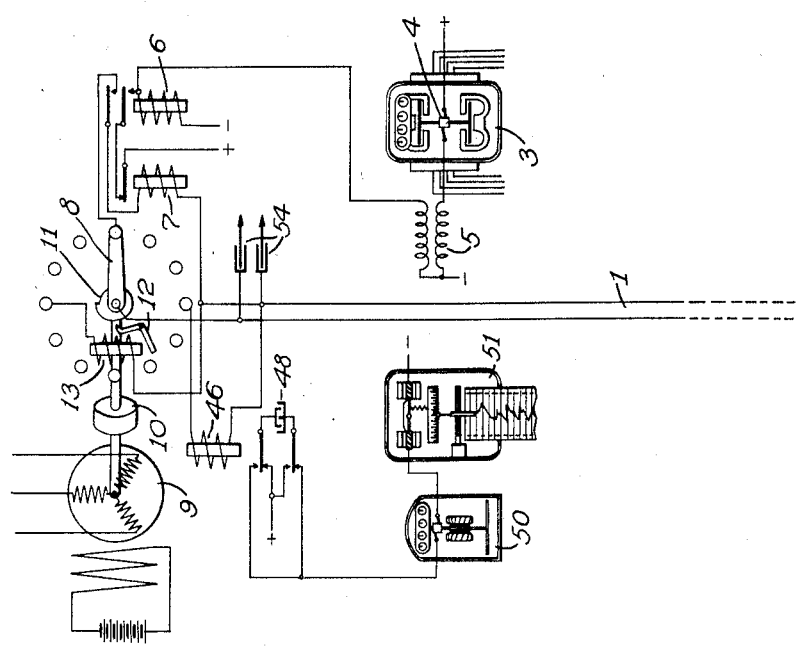
WITNESSES:
G. S. Neilson
E. R. Evans
INVENTOR
Benjamin H. Smith
BY
Wesley G. Carr
ATTORNEY

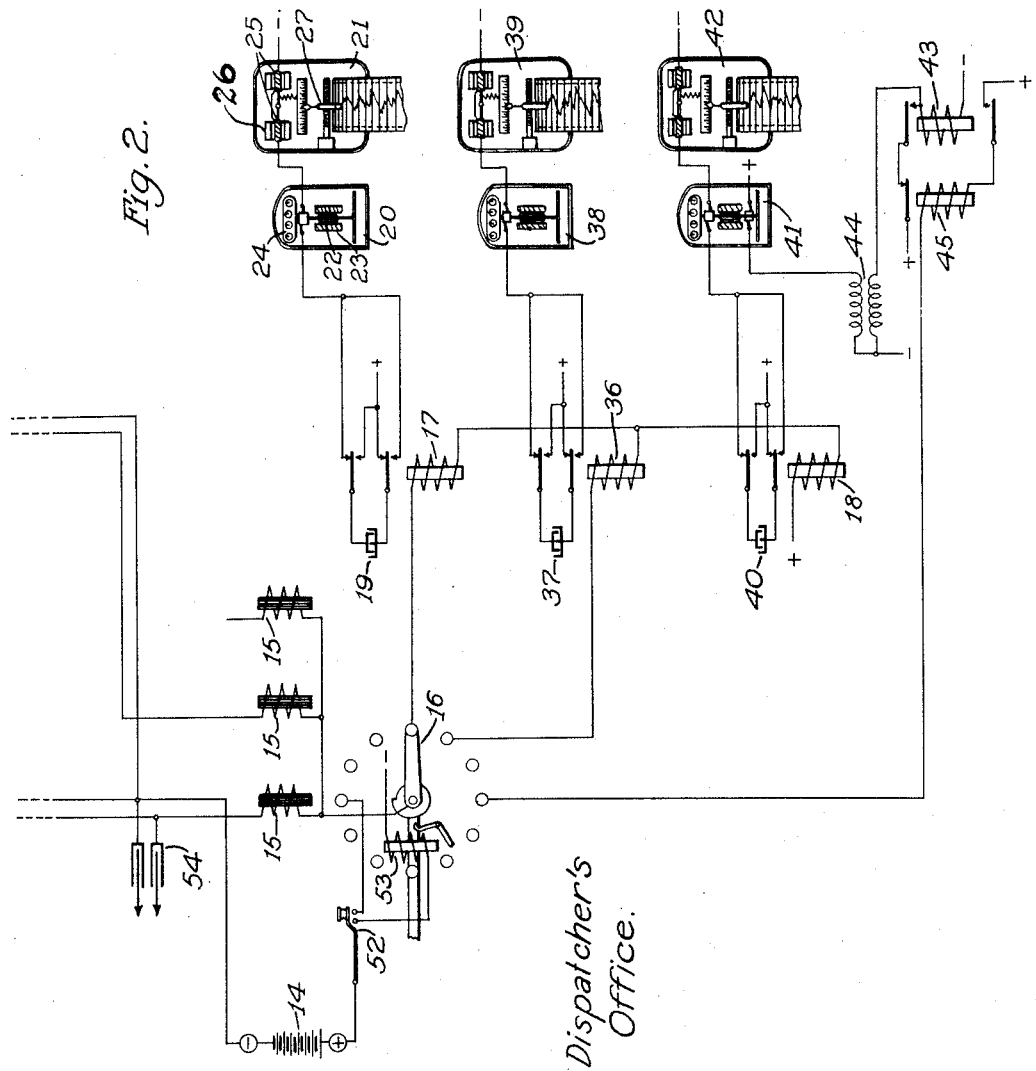

Patented Jan. 11, 1927.

1,614,212

UNITED STATES PATENT OFFICE.

BENJAMIN H. SMITH, OF SWISSVALE, PENNSYLVANIA, ASSIGNOR TO WESTINGHOUSE ELECTRIC & MANUFACTURING COMPANY, A CORPORATION OF PENNSYLVANIA.

METERING SYSTEM.

Application filed May 7, 1924. Serial No. 711,549.

My invention relates to metering systems and particularly to remote metering systems that are adapted for use in connection with a plurality of power substations.

The object of my invention is to provide a system that shall have means for indicating, in any substation and also at a central load dispatcher's office, the total system load.

Another object of my invention is to provide a system that shall have means for separately indicating the several substation loads at the dispatcher's office.

Another object of my invention is to accomplish the foregoing results over a single circuit between each substation or a group of substations and the central dispatcher's office.

Another object of my invention is to provide synchronous switching devices for connecting the respective meters of the system in circuit in predetermined sequence in order to decrease the number of connecting circuits required.

A further object of my invention is to provide a meter totalizing system having integrating means consisting of a stationary electrical network for totalizing the meter readings in contradistinction to the complex mechanical totalizing or transfer devices heretofore employed.

In practicing my invention, I provide a synchronous switch at each substation and at the dispatcher's office that serves to connect the respective meters in predetermined sequence to the connecting circuits between the substations and said office. Suitable mechanism is provided to insure that the switches remain in synchronism. Current-impulse generating devices are arranged to transmit current impulses over the connecting circuits at rates depending upon the respective loads or other quantities being measured. The rotation of the synchronous switches is preferably so rapid that not more than one impulse will be generated in each of the meter circuits connected to the contacts thereof during one revolution. At the dispatcher's office, a current-impulse integrating arrangement comprising an impulse relay and a condenser connected to a constant source of potential is provided. The relay is arranged to charge and discharge the condenser at a rate depending upon the magnitude of the quantity being measured, and the condenser current is measured directly by a standard meter of the integrating or graphic type.

In order to totalize the substation loads of the entire system, one impulse relay with an associated condenser at the dispatcher's office is connected in series with all of the other individual load relays. This relay and condenser actuate a totalizing meter in accordance with the total load. The totalizing meter is arranged to transmit current impulses back over the control circuits to operate totalizing meters at the respective substations.

For a more complete understanding of the details of my invention, reference may be had to the accompanying drawings, wherein—

Figure 1 is a diagrammatic view of the apparatus at two substations, and

Fig. 2 is a similar view of the apparatus at a central load dispatcher's office.

Referring to Fig. 1, the left-hand side of the drawing represents the metering equipment at substation A, and the right-hand side of the drawing represents similar equipment at a second substation B. These substations may be, for example, two substations in a power distribution system for altering the voltage or frequency of the supply for a local load.

A two-wire control trunk 1 connects the substation A with the metering apparatus at the dispacher's office, (Fig. 2) and a similar control trunk 2 connects the substation B to the same metering apparatus.

At substation A, a device is provided that is adapted to generate current impulses at a rate depending upon the magnitude of the quantity being measured. This current-impulse device is connected at intermittent intervals to the control trunk 1 through switch contacts. A similar current-impulse generating device operated in accordance with the load at substation B is connected at different times to the control trunk 2, and, in this way, the load indications or any measured quantities at the several substations are transmitted, without interference, to the dispatcher's office.

As shown, the current-impulse generating mechanism at substation A comprises an integrating or watthour meter 3, which may be either a direct-current or a single-phase or polyphase alternating-current meter. The rotating shaft of the meter 3 is provided with a commutator 4 adapted to close the primary circuit of a transformer 5. A relay 6 is connected in series with the secondary of the transformer 5 and is operated intermittently at a rate depending upon the operation of the meter 3. When the relay 6 is operated, a locking circuit is closed through its lower armature and front contact and the armature and back contact of relay 7. Therefore, relay 6, when operated, remains energized until relay 7 operates.

At its upper armature and front contact, relay 6 closes a circuit which includes a contact of a continuously rotating switch 8 that is driven by a synchronous motor 9. A friction clutch 10 is interposed between the motor 9 and the switch 8 to permit the rotation of the switch to be stopped when desired. A cam 11 is secured to the rotating switch member and co-operates with a latch 12 that is so controlled by a latch magnet 13 that, if the latch magnet is energized, the operation of the switch 8 is stopped with the movable switch arm in engagement with the uppermost contact.

Assuming that the switch 8 has reached the position shown in Fig. 1 and relay 6 is energized, a circuit is closed from battery 14 (Fig. 2) through one conductor of the control trunk 1, the winding of the relay 7, the upper armature and front contact of relay 6, the switch 8, the second conductor of the trunk 1, an inductance coil 15, a switch 16 at the control office operated in synchronism with the switch 8, the winding of relay 17 and the winding of relay 18. Relays 7, 17 and 18 are energized in series, relay 7 opening the locking circuit of relay 6, whereupon the latter becomes de-energized and remains de-energized until it is again energized by the meter 3. The operation of relay 17 closes a circuit from battery through the upper armature and front contact of the relay, the condenser 19, the lower armature and front contact of relay 17, the winding of a direct-current integrating ampere-hour meter 20 and the winding of a graphic meter 21.

The ampere-hour meter 20 may be of the usual direct-current motor-driven type comprising a rotatable armature 22, a field 23 and a register 24 for recording the integrated load. This meter is calibrated by suitable adjustment and by fixing the capacity of the condenser 19 to correspond to the meter 3, so that the integrated load measured by the meter 3 is recorded upon the register 24.

The graphic meter 21 may be of the usual Kelvin balance type, similar to that shown in my prior Patent No. 1,194,084, dated August 8, 1916, and comprises movable windings 25 in the field of the permanent magnet 26, the torque of the movable member being balanced by a resilient connection to the motor driven pointer 27 in the usual manner.

This meter is suitably calibrated to record the instantaneous fluctuations of the load. On account of the time elapsing between successive impulses, which may be several seconds at low loads, the meter 21 is somewhat retarded in its response to changes of load. It is possible to obtain this result because of the large inertia of the moving parts and the small forces involved. The retardation of the meter 21 is an advantage in this case because it renders the graphic record more legible, and the average maximum and minimum values are accurately measured.

At substation B, two watthour meters 28 and 29 are provided corresponding to the meter 3 at substation A. These meters may be connected to measure the load in any two circuits. A rotating switch 30, similar to the switches 8 and 16, is also provided at the substation B and is driven synchronously with the switches 8 and 16. The movable switch member of the switch 30 is provided with latching mechanism 31 similar to that shown in connection with switches 8 and 16. A locking relay 32, corresponding to relay 6, is arranged to store up the load indications of the meter 28. The relay 32 is unlocked by a relay 33 corresponding to relay 7 and controlled over the trunk circuit 2. Relays 34 and 35 are provided in connection with the meter 29 and correspond in function to the relays 32 and 33.

It will be apparent that, as the switch 30 engages successive contacts, it will transmit impulses over the trunk corresponding to the load recorded by the meters 28 and 29.

Since these meter readings are transmitted successively, obviously, the meters 28 and 29 might be located in two separate substations, in which case, both substations would be connected to the dispatcher's office, (Fig. 2) by the single control trunk 2. The meters 28 and 29 may also be utilized in a single substation to transmit two separate loads such as the 25-cycle load and the 60-cycle load where the substation supplies distribution systems with different frequencies.

From the foregoing description of the operation of substation A, it will be apparent that the energization of relay 32 will cause the energization of relay 36 (Fig. 2) through a circuit including the switches 30 and 16. Relay 18 will also be energized in series with the relay 36. The operation of relay 36 will charge the condenser 37 in series with the integrating meter 38 and the graphic meter 39. The meters 38 and 39 correspond to the meters 20 and 21 and are so calibrated as to be actuated in accordance with the meter 28 or the load at substation B. Meters similar to 38 and 39 (not shown) are provided to give an indication of the load recorded by meter 29 at the dispatcher's office.

The relay 18 is a totalizing relay and is connected in series with the other relays, such as 17 and 36, corresponding to the meters that it is desired to totalize. A condenser 40 is connected to the contacts of relay 18 to actuate the integrating meter 41 and the graphic meter 42 in accordance with the total load. The meter 41 is also provided with an additional commutator controlling the circuit of the locking relay 43 through the transformer 44. The locking circuit of the relay 43 is controlled by a relay 45. When the switches 8, 16 and 30 reach the lowermost contact, a circuit is closed through the contacts of relay 43, the winding of relay 45, the switch 16, the reactance coils 15, the switches 8 and 30 and relays 46 and 47 in parallel. The relays 46 and 47 control the circuits of condensers 48 and 49, that are connected to actuate the meters 50 and 51 at substation A and similar meters at substation B in accordance with the total load, as recorded by the meter 41 at the dispatcher's office. In this manner, a totalizing meter in each substation is operated over the same control trunk that is used for transmitting substation load readings to the dispatcher's office.

In order to maintain the switches 8, 16 and 30 in synchronism, a key 52 is provided at the dispatcher's office. This key controls the circuit of the latch magnets upon the respective switches so that, by momentarily depressing this key, all of the switches may be brought into synchronism. Upon the actuation of the key 52, a circuit is closed from battery through the latch magnet 53 of the switch 16, and another circuit is closed from battery through the uppermost contact of the switch 16, which is closed when the switch is in its latched position, the inductance coils 15, the switches 8 and 30 and the latch magnets 13 and 31. In this manner, all of the switches are momentarily latched in the same relative position, and upon the subsequent release of the key 52, all of the switches rotate in exact synchronism.

While I have shown but one locking relay 6 for storing up the meter impulses for subsequent transmission and arrange to drive the switches 8 so rapidly that there will never be more than one impulse during a revolution of a switch, I contemplate also, in some instances, the use of various other expedients in common use in the current-impulse systems of the telegraph and automatic telephone arts. Thus, while the switch 8, as shown, may rotate at a rate of 4 or 5 revolutions per second and the maximum rate that impulses are produced by the meter 3 may be 2 or 3 per second, it is obvious that these values may vary considerably without departing from the scope of my invention.

The character and frequency of the current impulses transmitted over the trunks 1 and 2 will not interfere with telephonic transmission and, if telephones are connected to condensers 54, communication may be established between the substations and the dispatcher's office. The trunks 1 and 2 may be ordinary telephone lines. The inductance coils 15 taper the current impulses so that no inductive disturbance is produced when the pairs of a multiple-conductor telephone cable are utilized for the connecting circuits.

It will be apparent that I have devised a relatively simple system for transmitting load indications or other desired quantities from a number of substations or separated points to a central point, a single transmitting circuit being used for one or more substations. Furthermore, the system embraces an improved method of totalizing the load indications from several substations and providing a record in each substation of the total system load utilizing the same connecting circuits over which the several load indications are transmitted to the central office.

I claim as my invention:

1. A metering system comprising a plurality of separated substations, meters in said substation, a totalizing device in each substation, and means for actuating all of said totalizing devices in accordance with the sum of the meter indications.

2. A metering system comprising a plurality of separated substations, a dispatcher's office, meters in said substations, a totalizing device in each substation and in the dispatcher's office, and means for actuating all of said totalizing devices in accordance with the sum of the meter indications.

3. A metering system comprising a plurality of substations, a dispatcher's office, meters in said substations, a circuit extending from each substation to said office, totalizing meters in said substations and said office, and means for actuating said totalizing meters over said circuits in accordance with the sum of the readings of the first-mentioned meters.

4. A metering system comprising two separated electrical power stations, a circuit connecting said stations, meters in each station, and means for actuating a meter at each station over said circuit in accordance with predetermined loads.

5. A metering system comprising a substation and a dispatcher's office, a circuit connecting said substation and office, two meters at the substation, a third meter at the dispatcher's office, means for actuating the last-mentioned meter over said circuit in accordance with the operation of one of the first-mentioned meters, and means for actuating the other of the first-mentioned meters over said circuit in accordance with the operation of said third meter.

6. A metering system comprising a substation and a dispatcher's office, a circuit connecting said substation and office, a station-load meter and a totalizing meter at the substation, a totalizing meter at the dispatcher's office, means for actuating the last-mentioned meter over said circuit in accordance with the operation of said station-load meter, and means for actuating the substation totalizing meter over said circuit in accordance with the operation of said dispatcher's office totalizing meter.

7. A metering system comprising a single circuit, two meters at opposite ends of said circuit, and means for operating both said meters over said circuit from the opposite ends thereof.

8. A metering system comprising a single circuit, a plurality of meters, and means for transmitting current impulses over said circuit to operate said meters successively to either the same or a different extent.

9. A metering system comprising a plurality of meters, a locking relay for each meter, a plurality of synchronously-driven switches, a totalizing relay, means including said switches for successively unlocking said relays and operating said totalizing relay, and a totalizing device controlled by said totalizing relay.

10. A metering system comprising a plurality of meters, a totalizing instrument, means including synchronous switches for successively associating said meters with said instrument, and means for synchronizing said switches.

11. A metering system comprising a plurality of impulse relays, a totalizing relay connected in series with all of said impulse relays, and a meter controlled by said totalizing relay.

12. A metering system comprising a plurality of impulse relays, a totalizing relay, condensers connected to the contacts of said relays, means including said relays for intermittently charging said condensers, and a plurality of meters actuated by the condenser currents.

13. A metering system comprising a plurality of individual meters, a totalizing meter, means connected to said individual meters for actuating said totalizing meter, a plurality of other meters, and means connected to said totalizing meter for actuating said other meters.

14. A metering system comprising a plurality of individual meters, a totalizing meter, a circuit from each of said individual meters to said totalizing meter, means for operating said totalizing meter over said circuits, a plurality of other meters, and means for operating said other meters over said circuits in accordance with the operation of said totalizing meter.

15. A metering system comprising a plurality of substations, a dispatcher's office, integrating and indicating meters at said substations and office, means for actuating said meters at the dispatcher's office to measure the instantaneous and the integrated substation and total system loads, and means for actuating the meters at each substation in accordance with the total instantaneous and integrated system load.

16. A metering system comprising a plurality of substations, a dispatcher's office, circuits connecting the substations to said office, integrating and indicating meters at said substations and office, means for actuating said meters at the dispatcher's office over said circuits to measure the instantaneous and the integrated substation and total system loads, and means for actuating the meters at each substation over the same circuits in accordance with the total instantaneous and integrated system load.

In testimony whereof, I have hereunto subscribed my name this 2nd day of May, 1924.

BENJAMIN H. SMITH.